Dec. 29, 1953   J. BRAUNWALDER ET AL   2,664,128
FOOD CHOPPER
Filed Feb. 27, 1950   2 Sheets-Sheet 1
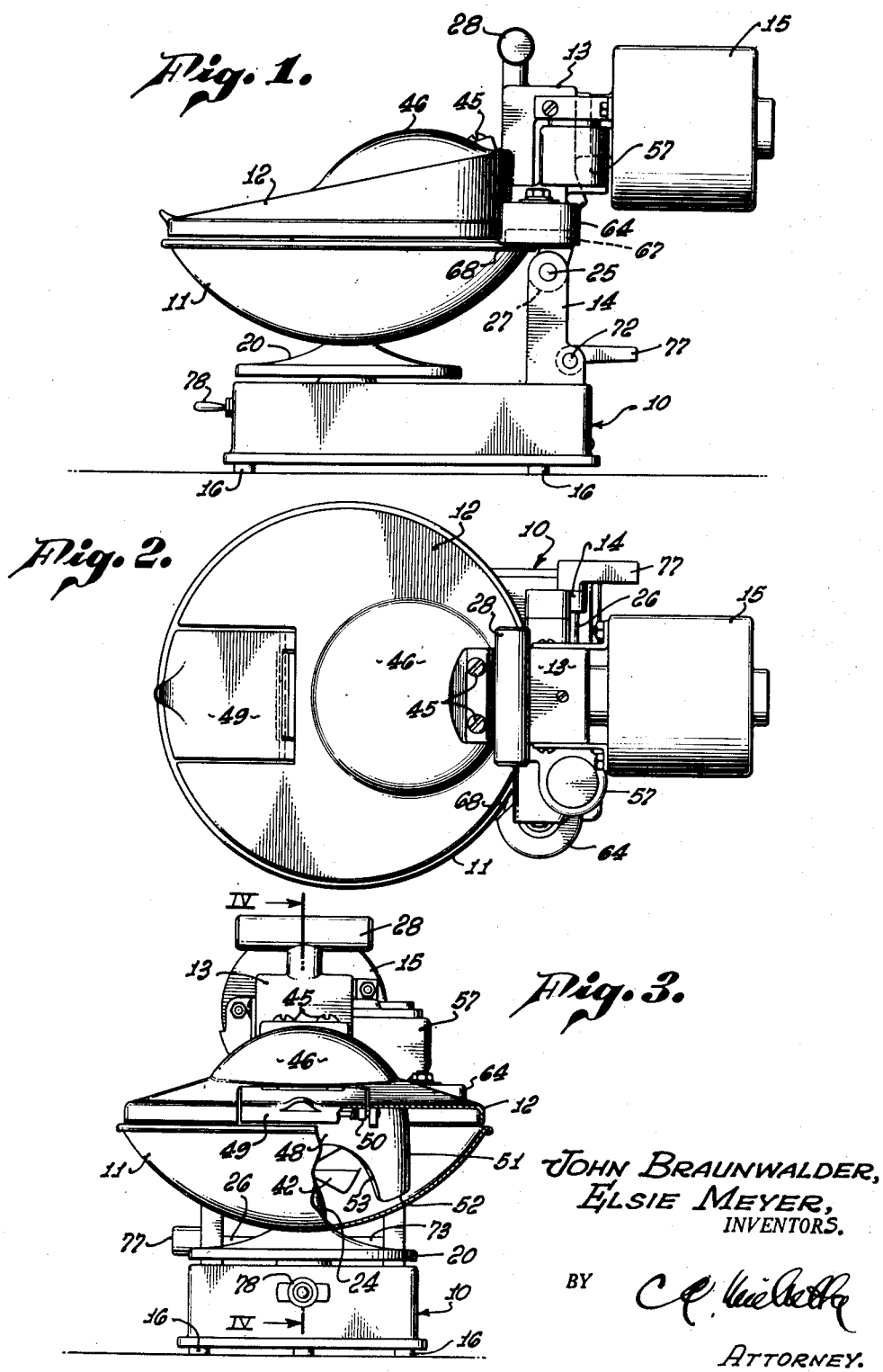
JOHN BRAUNWALDER,
ELSIE MEYER,
  INVENTORS.
BY
ATTORNEY.

Dec. 29, 1953   J. BRAUNWALDER ET AL   2,664,128
FOOD CHOPPER
Filed Feb. 27, 1950   2 Sheets-Sheet 2
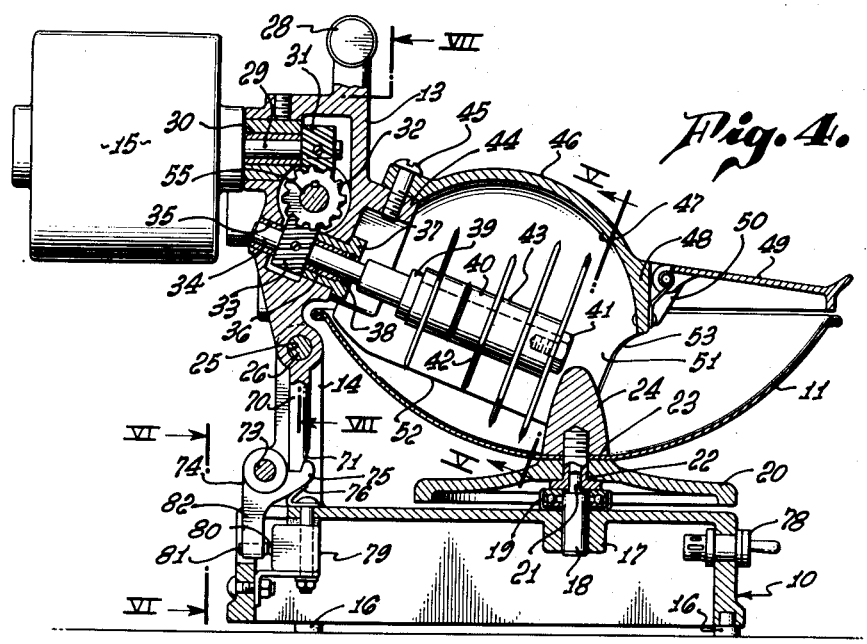
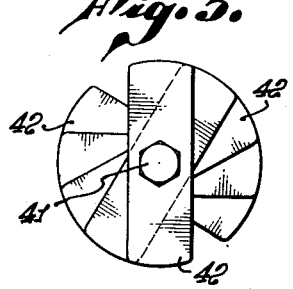
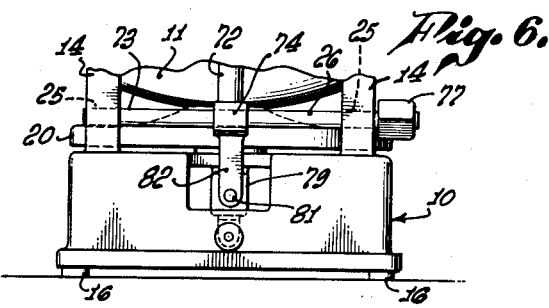
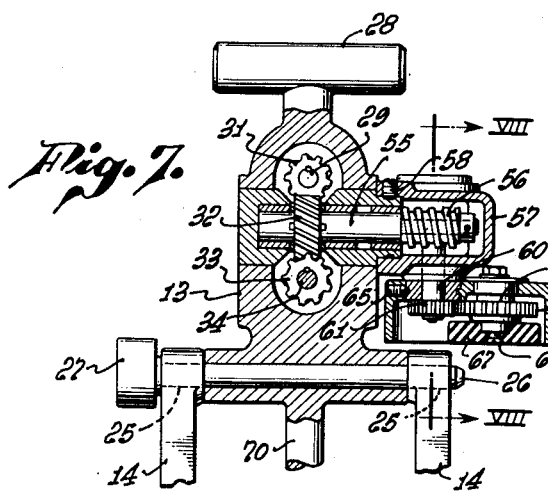
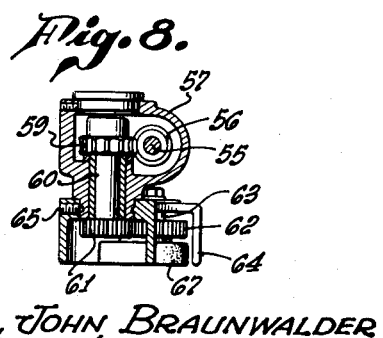
JOHN BRAUNWALDER
ELSIE MEYER,
INVENTORS.
BY
ATTORNEY.

Patented Dec. 29, 1953

2,664,128

UNITED STATES PATENT OFFICE 2,664,128

FOOD CHOPPER

John Braunwalder, Glendale, and Elsie Meyer, Los Angeles, Calif.; said Braunwalder assignor to said Meyer Application February 27, 1950, Serial No. 146,494

4 Claims. (Cl. 146—67)

This invention relates to an improved household food chopping device especially adapted for use in chopping small quantities of food as required in a household. This application is a continuation in part of Serial No. 74,764, filed February 5, 1949, now Patent No. 2,582,475 issued January 15, 1952, entitled Food Chopper by John Braunwalder and Elsie Meyer.

The preparation of various courses or dishes may include ingredients such as vegetables, fish, meat and the like, which are reequired to be cut into small pieces for proper mixing and blending of the ingredients into a resultant dish of desired flavor or taste. Preferably cutting of the food into small pieces is accomplished by a chopping action as distinguished from a grinding action because it is believed that the wholesome characteristics of the food are not only retained but in some cases are brought forth so that the entire preparation is made more tasty and savory.

Prior means for chopping food included manually chopping the food in a wooden bowl by means of a device having a pair of parallel spaced blades. Prior mechanical devices included electrically-driven blades for cutting the food into small pieces by a reciprocating action which resulted in considerable noise and vibration. In such prior devices the path of travel of the food into the chopping blades was not defined or controlled, with the result that moving the food toward and into the chopping blades by manual means was a dangerous and hazardous operation. When a bowl in the prior devices was mounted for rotation, rotation of the bowl depended either upon transmission of turning forces to the bowl by movement of the chopping blades or upon manual rotation of the bowl. The result in either case is unsatisfactory.

The primary object of this invention is to design and provide an improved household food chopping device wherein the above disadvantages are obviated and wherein the device may be conveniently and easily manufactured and is designed to perform a particularly efficient, effective chopping operation on food placed in the device.

An object of this invention is to provide a food chopping device wherein positive means are provided for rotating the bowl carrying the food to be chopped so that the food is positively moved into the path of the chopping blades.

Another object of this invention is to provide a chopping device wherein means are provided adjacent the chopping blades for forming the chopped food into a somewhat circular concentrated mass (in cooperation with positive rotation of the bowl) whereby a formed mass of food is carried along a path of travel directly into the chopping blades.

A further object of this invention is to design and provide a food chopping device of the character stated above wherein automatic safety means for rendering an electric power circuit ineffective is provided when the cutting blades are not in operative position.

This invention contemplates a food chopping assembly, including a driven shaft and cutting blades thereon, which is so mounted as to be partially counterbalanced by an electric motor which drives the cutting blades and shaft.

Other objects and advantages of this invention will be readily apparent from the following description and drawings.

In the drawings:

Fig. 1 is a side elevation of an improved food chopping device embodying this invention.

Fig. 2 is a top plan view of the device shown in Fig. 1.

Fig. 3 is a front view of the device shown in Fig. 1, a portion of the bowl and cover being broken away.

Fig. 4 is a sectional view taken in a vertical longitudinal plane bisecting the device as indicated by the line IV—IV of Fig. 3.

Fig. 5 is a front view of the driven shaft and blades mounted thereon.

Fig. 6 is a fragmentary rear view of the lower portion of the device shown in Fig. 1.

Fig. 7 is a fragmentary sectional view taken in the planes indicated by the line VII—VII of Fig. 4.

Fig. 8 is a fragmentary sectional view taken in the plane indicated by the line VIII—VIII of Fig. 7.

Referring to the drawings, the improved household food chopping device, generally speaking, comprises a base 10 carrying a rotatively mounted chopping bowl 11 over which is supported a cover 12 enclosing a chopping blade assembly which extends diagonally downward into the bowl 11. The cover 12 and the chopping blade assembly is carried by a gear housing 13 pivotally supported from spaced trunnions 14 on base 10. An electric motor 15 supported from gear housing 13 on the opposite side of the pivot mounting of the gear housing from the cover 12 partially counterbalances the cover and chopping blade assembly.

The inverted hollow elongated rectangularly shaped base 10 may be provided with spaced resilient yieldable cushions or pads 16 for seating the device on a surface. Adjacent the forward portion of the base and along its longitudinal axis may be provided a depending boss 17 having an upwardly directed fixed stub shaft 18. The shaft 18 is encircled by a thrust roller bearing assembly 19 for rotatably mounting above the base a flanged disc 20. A reduced upper portion 21 of shaft 18 is removably received within an upwardly extending externally threaded hollow headed stud 22 which carries disc 20. The disc 20 may be provided with a central annular raised seat 23 upon which is seated the concave chopping bowl 11 made of any suitable hardened corrosive resistant metal. The stud 23 extends axially through the disc 20 and the bottom of bowl 11 for threaded engagement with a central upstanding bowl securing and food dispersal knob 24.

Adjacent the rear edge of base 10 the gear housing 13 is pivotally supported from the spaced, upstanding trunnions 14 at 25 by means of a horizontally extending removable pin 26 having a tapered end. The pin 26 may be provided with an enlarged head 27 at its other end for facilitating grasping when the pin is removed. The gear housing 13 includes a top T-shaped handle 28 for facilitating tilting of the housing and its associated parts rearwardly about pivotal axis 25.

The gear housing 13 carries an electric motor 15 which is provided with a motor shaft 29 journaled in said housing by a bushed sleeve 30. A pinion gear 31 carried on the end of the motor shaft 29 engages a gear 32 which is meshed with a gear 33 carried adjacent one end of a downwardly diagonally directed driven shaft 34.

One end of the shaft 34 may be mounted in the gear housing by suitable bushings 35 and 36, the bushing 36 being carried in a headed securing sleeve 37 having sealing means 38. The shaft 34 is provided with a centrally disposed shoulder 39 against which may seat one end of a chopping or cutting blade assembly 40, said blade assembly being secured on the shaft 34 by means of a single bolt 41 threaded into the lowermost end of shaft 34. It should be noted that the axis of shaft 34 and the axis of rotation of bowl 11 about stub shaft 18 lie in the same plane, and that the cutting blade assembly 40 extends virtually to the vertical axis of the rotation of bowl 11 and towards the center of the bowl.

The cutting blade assembly 40 comprises a plurality of longitudinally spaced and angularly offset chopping blades 42, each chopping blade comprising a thin elongated piece of metal having diametrically opposite ends provided with arcuate cutting edges which may extend in an arc of from 20° to 60°. If desired, each blade may be provided with side cutting edges adjacent the end cutting edges. In the blade assembly shown, the blades may be spaced by tubular filler blocks 43 which may be varied in thickness to regulate the fineness or coarseness of the chopped food. The chopping blades 42 may be mounted on a single tubular sleeve as a unit, the sleeve unit being then readily installed or removed from the shaft 34 by unscrewing the bolt 41.

The cutting blades 42 illustrated are of virtually the same length and extend when in vertical position into close proximity with the bottom adjacent portions of the bowl 11. If desired, the cutting blades 42 may be of varying length so that each blade will reach into close uniform proximity with the bottom portion of bowl 11 throughout the length of the blade assembly.

It should be noted that the successive angular displacement of the blades along the shaft bring the blades into sequential chopping position. A continuous chopping action is thus afforded, which reduces to a minimum variations in load on the motor; and the food, when under the chopping blades, is moved outwardly from the center of the bowl.

The gear housing 13 may be provided with a forward downwardly inclined flange 44 for supporting the cover 12 by screw bolts 45. The cover 12 may include a central dome-shaped blade guard 46 having a smoothly curved interior concave surface 47 for facilitating internal cleaning of cover 12. A forward downwardly extending internal flange 48 of guard 46 affords means for mounting a hinged, spring biased, flat lid 49 providing an opening through which food to be chopped may be passed. The lid 49 is provided with a pair of spaced side lugs 50 which abut flange 48 when the lid is in normal closed position (Fig. 4) with respect to the top edge of the bowl.

The guard 46 is also provided with a downwardly directed curved internal extension wall 51 projecting into bowl 11 at one side of the blade assembly. The wall 51 may be provided with a bottom straight edge 52 lying virtually parallel to the axis of the shaft 34 and in proximity with the bottom of the bowl. The forward edge 53 of wall 51 curves upwardly to merge with the edge of flange 48, said wall 51 being cooperable with the rotating blades and the rotatable bowl 11 to form a concentrated mass of chopped food as described later in more detail.

Means for positively rotating bowl 11 may be provided by a gear train driven from motor 15. The gear 32 is carried on a horizontal shaft 55 provided with a worm thread 56 at one end. The worm thread 56 is enclosed in a suitable auxiliary housing 57 secured by any convenient means as at 58 to the gear housing 13. The worm thread 56 engages a gear 59 carried on the upper end of a vertical shaft 60, the lower end of said shaft carrying a gear 61 meshed with a driven gear 62 lying in substantially the same horizontal plane. The driven gear 62 is carried on a vertical shaft 63 which may be enclosed in an inverted hollow cup-shaped housing 64 secured to auxiliary housing 57 by any suitable means as indicated at 65. On the lower end of shaft 63 is secured by screw bolt 66 a driven wheel or disc 67 of compressible yieldable material, the circumferential edge of which contacts the rim of the bowl 11 as at 68 (Fig. 2). The gear ratios of the bowl rotating means are preferably selected so that the bowl will slowly rotate as, for example, at a rate of about 10 R. P. M.

Means for holding the chopping blade assembly in accurate and proper operating position within the bowl 11 comprises a depending arm 70 integrally formed on the gear housing between trunnions 14, the lower end of said arm 70 being provided with a flat diagonal surface 71. The trunnions 14 may be enlarged adjacent base 10 to provide pivotal mounting as at 72 for a horizontally extending rod 73 provided with a central fixed latch 74, said latch 74 including a horizontally extending portion 75 provided with an upstanding lip having an inner surface complementary to the tapered surface 71 for locking engagement therewith when arm 70 is in proper vertical position. The latch 74 is spring-biased by plate spring 76 secured to the base for maintaining the arm and lip in holding engagement.

The rod 73 is provided at one end with a horizontally extending operating handle 77 which may be lifted for rotating the latch counterclockwise in order to disengage arm 70 with the lip on latch 74 and thus release the gear housing for rotation in a counterclockwise direction or rearwardly for lifting the chopping blade assembly out of the bowl 11.

A master switch 78 provided on the front portion of the base 11 may be electrically connected to a micro-switch 79 carried within the rear portion of the base for providing automatic safety means for breaking the circiut to the motor when the chopping blade assembly is not in proper operating position. The micro-switch 79 includes a spring-biased button 80 which is contacted and held in circuit making position by a pin 81 carried on a downwardly directed portion 82 integrally formed on latch 74. As illustrated in Fig. 4, when the cutting blade assembly is in proper operating position and latch 74 is in holding engagement with the arm 70 the portion 82 is in vertical position and the pin 81 is in pressing contact against the button 80 on the micro-switch for closing the circuit. When the cutting blade assembly is not properly positioned and the portion 82 is diagonally inclined, as when the gear housing is pivoted about the pin 26, the pin 81 will be out of pressing contact with button 80 and the micro-switch 79 will be in open position, thereby breaking the electrical circuit to motor 15.

In operation, when the cutting blade assembly is properly positioned for operation and locked therein by latch 74, the micro-switch 79 is in circuit making position and switch 78 is operable to energize the motor for driving the blade assembly. Food introduced into the bowl through the opening in the cover will be carried by the rotating bowl to the chopping blades. After the food passes through the chopping blades where it is moved outwardly from the center of the bowl and given a slightly upwardly directed movement by the rotating blades, the food is carried against wall 51 principally by rotation of the bowl and partly by action of the chopping blades. The rotation of the bowl causes food piled up against the wall 51 to continuously emerge from the forward opening defined by curved edge 53 in a concentrated formed mass. The rotating bowl returns this formed mass of food to the chopping blades for further cutting. Since the bowl is positively rotating at a relatively slow speed the extension wall serves to generally define the outer extremities of the mass and the path of travel of the food to and from the chopping blade assembly is well defined and controlled. As a ressult, a maximum efficient chopping operation is thus provided. The straight bottom edge 51 of the wall may be curved if desired to conform with the configuration of the bottom of the bowl.

When the chopping operation is completed, the cover and blade assembly is lifted free of the contents of the bowl by releasing latch 74 and tilting the gear housing and associated parts rearwardly. The bowl and disc may then be removed for emptying the contents of the bowl.

It will thus be readily apparent to those skilled in the art that the cooperative relationship between the angularly displaced chopping blades, the curved extension wall projecting into the bowl, and the positive means for rotating the bowl during a chopping operation affords means whereby the food being chopped is automatically carried in a path of travel and in a concentrated formed mass to provide a highly effective chopping efficiency.

It should also be noted that the cover is designed to provide maximum safety for the hands of a person introducing food into the bowl through the opening covered by the lid on the forward portion of the cover. The forward downwardly directed flange 48, together with the dispersal knob 24 substantially effectively obstructs possible passage of fingers into the chopping blade assembly. The handle provided on top of the gear housing facilitates carrying the chopping device and tilting the gear housing and associated parts about its pivotal axis 25. The gear housing is easily removed from the base for cleaning by removing pin 26 which may be easily grasped at one end. The pin 26 is also provided with a pointed end to facilitate re-inserting the pin in the trunnion for supporting the gear housing. The bowl assembly is readily removable by merely lifting the bowl and disc from engagement with the reduced portion of the stub shaft 18.

It will be understood by those skilled in the art that various modifications of the above chopping device may be made without departing from the spirit of this invention; for example, the number of blades employed in the chopping assembly and the spacing of the blades may be varied, the angular arrangement of the blades may be changed to provide a desired chopping action, the configuration of the interior extension wall of the blade guard may be modified in order to produce a somewhat differently formed concentrated mass of food, and the gear arrangement for driving the chopping blade assembly and the bowl driving means may be changed to produce different relative speeds of operation. It is intended that any such modifications coming within the scope of the appended claims are embraced thereby.

We claim:

1. In a household food chopping device, the combination of: a base; a removable bowl rotatably mounted on said base; a chopping blade assembly pivotally carried by the base and extending radially and downwardly into the bowl toward the center thereof; a cover for the bowl including a blade guard portion, said blade guard portion including an internal curved extension wall extending into the bowl at one side of the blade assembly and having a bottom edge lying in a plane virtually parallel to the axis of the blade assembly, and spaced in proximity to the internal surface of the bowl, said extension wall terminating in a curved, concave edge adjacent to the center of the bowl for concentrating food particles delivered by the chopping blade assembly; and means for positively rotating said bowl for forming a concentrated food mass against said wall and for moving said mass along and beyond the extension wall.

2. In a household food chopping device, the combination of: a base; a bowl mounted for rotation on said base; a gear housing pivotally supported from the base; a chopping blade assembly and cover carried by the gear housing with the blade assembly extending radially downward toward the axis of rotation of the bowl, said blade assembly including a series of elongated blades having end cutting edges and positioned between approximately the center of the bowl and the periphery thereof; means for driving said blade assembly carried by the gear housing in counter-balancing relation to the blade assembly; an interior curved wall on the cover extending below the top of the bowl and along one side of the blade assembly in spaced relation thereto and having a bottom edge lying in a plane parallel to the blade assembly and in proximity to the bottom of the bowl and terminating in a concave edge adjacent to the center of the bowl; and means driven by said blade assembly driving means for rotating the bowl to concentrate chopped food against the internal wall and to move the concentrated food along the wall and away therefrom in a defined path of travel for return into the blade assembly.

3. In a food chopping device, the combination of: a base; a bowl mounted on said base for rotation about a vertical axis; a chopping blade assembly including a shaft having a downwardly inclined axis directed toward the axis of rotation of the bowl and a plurality of longitudinally spaced elongated blades extending from approximately the axis of rotation of the bowl to the periphery thereof and arranged in angularly displaced relation, each blade having a cutting edge at each end thereof; a cover for said bowl and said assembly, said cover including a depending curved internal wall extending into the bowl at one side of the blade assembly extending from the circumferential edge of the bowl and terminating beyond the intersection of the axis of the shaft with the axis of the bowl, the bottom edge of said wall lying in proximity to the internal surface of the bowl, said wall presenting a concave face spaced from the cutting edges of said blades, said wall having a curved edge adjacent the center of the bowl forming a recess adapted to shape a food mass flowing along said wall and passing through said recess; and means including a friction wheel for positively rotating said bowl for forming a concentric food mass against said wall and for moving said mass along and beyond said internal wall.

4. In a food chopping device, the combination of: a base; a bowl mounted on said base for rotation about a vertical axis; a pivoted chopping blade assembly including a shaft having an axis adapted to be directed toward the axis of rotation of the bowl and a plurality of longitudinally spaced elongated blades arranged in angularly spaced relation between the axis of the bowl and the periphery thereof, each blade having a cutting edge; a cover for said bowl and said assembly; means for rotating said bowl whereby movement in a circular path is imparted to food particles carried in said bowl; and means carried by said cover including a curved extension wall extending below the top of the bowl at one side of the blade assembly, said wall having a bottom edge lying in proximity to the internal surface of the bowl and having a curved edge adjacent to the center of the bowl, said wall lying across the normal circular path of the food particles to cause an abrupt directional change in said path whereby food particles are concentrated against said wall along its length and whereby the concentrated food particles spaced from the innermost end of said wall are subjected to additional chopping by the blade assembly as they move in the new path of travel along said wall.

JOHN BRAUNWALDER.
ELSIE MEYER.

References Cited in the file of this patent

UNITED STATES PATENTS

| Number | Name | Date |
|---|---|---|
| 212,113 | Schurch et al. | Feb. 11, 1879 |
| 1,029,141 | Nielsen | June 11, 1912 |
| 1,488,250 | Hottmann | Mar. 25, 1924 |
| 1,512,434 | Porter | Oct. 21, 1924 |
| 1,724,598 | Johnston | Aug. 13, 1929 |
| 1,929,864 | Aeschbach | Oct. 10, 1933 |
| 2,245,012 | Robinson | June 10, 1941 |
| 2,582,475 | Braunwalder et al. | Jan. 15, 1952 |

FOREIGN PATENTS

| Number | Country | Date |
|---|---|---|
| 689 | Switzerland | Mar. 5, 1889 |
| 5,660 | Great Britain | Mar. 13, 1908 |
| 15,804 | Denmark | Apr. 1, 1912 |
| 203,234 | Germany | Oct. 16, 1908 |